Figure 1:
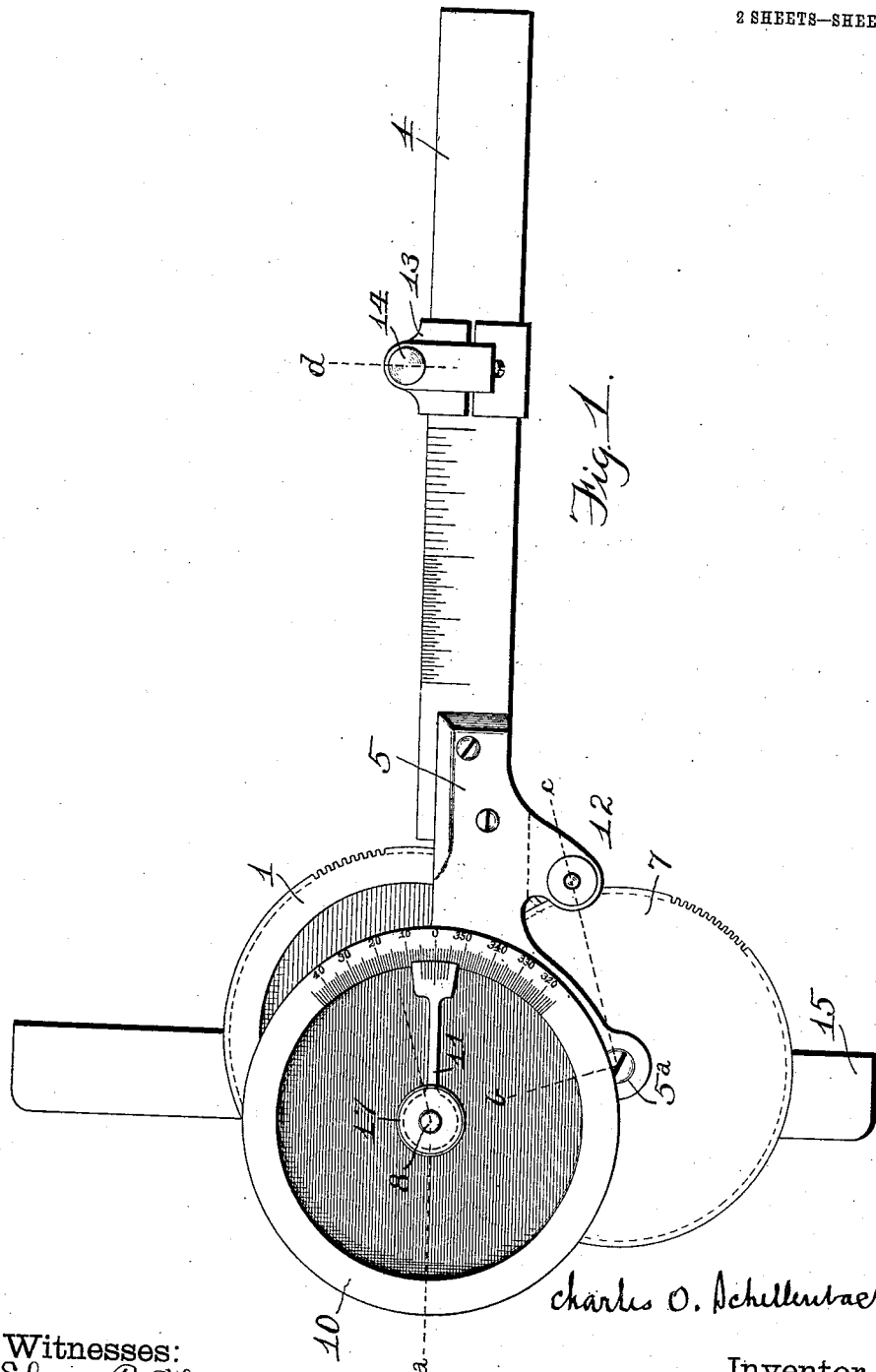

C. O. SCHELLENBACH.
PROTRACTOR.
APPLICATION FILED JUNE 22, 1908.

909,686.

Patented Jan. 12, 1909.

2 SHEETS—SHEET 1.

Witnesses:
Elmer R. Shipley,
M. S. Belden.

Inventor
Charles O. Schellenbach
by James W. See
Attorney

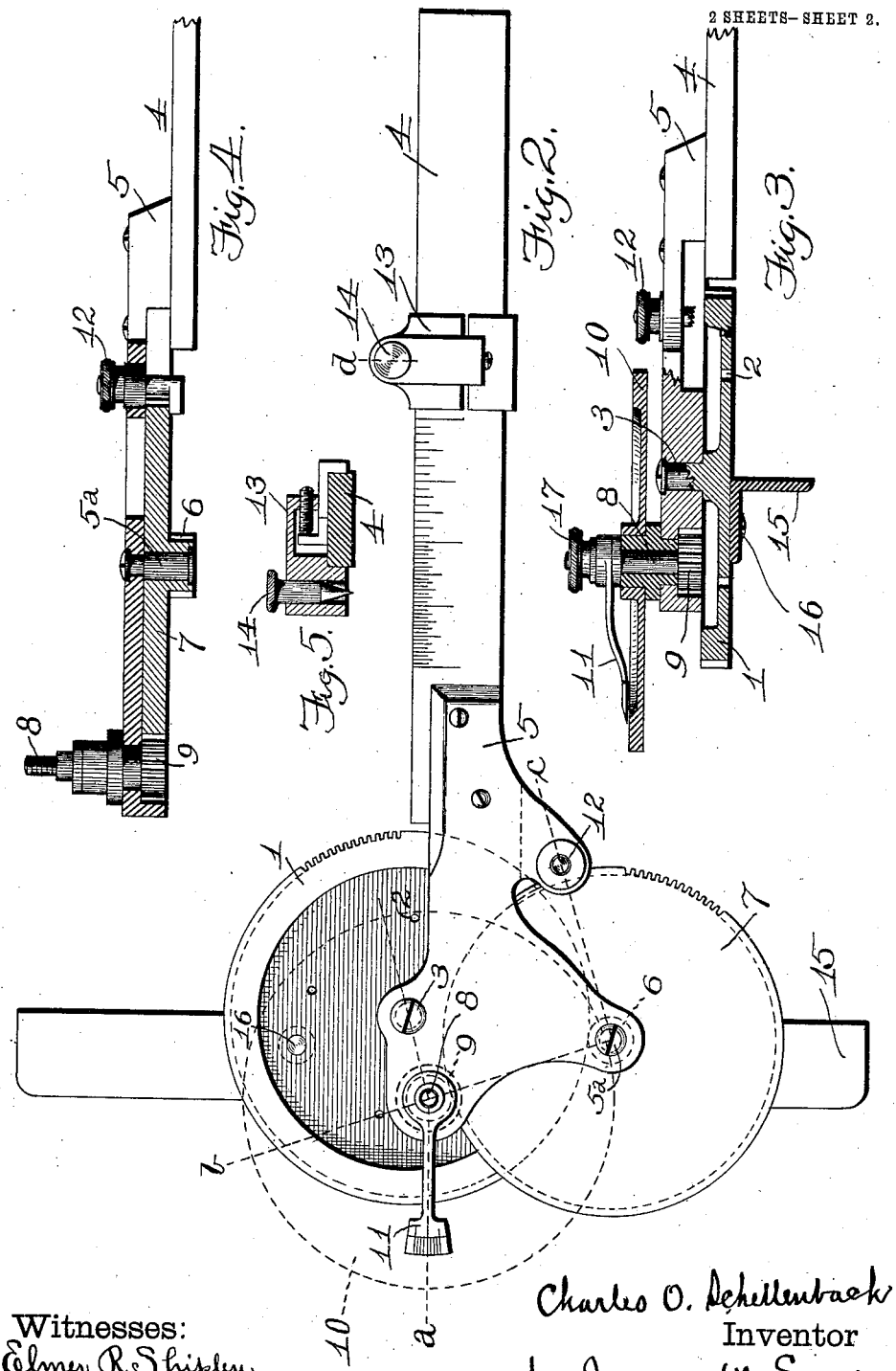

UNITED STATES PATENT OFFICE.

CHARLES O. SCHELLENBACH, OF CINCINNATI, OHIO.

PROTRACTOR.

No. 909,686.  Specification of Letters Patent.  Patented Jan. 12, 1909.

Application filed June 22, 1908. Serial No. 439,692.

*To all whom it may concern:*

Be it known that I, CHARLES O. SCHELLENBACH, a citizen of the United States, residing at Cincinnati, Hamilton county, Ohio, have invented certain new and useful Improvements in Protractors, of which the following is a specification.

This invention, pertaining to improvements in protractors, will be readily understood from the following description taken in connection with the accompanying drawings in which:—

Figure 1 is a plan of a protractor exemplifying my present invention: Fig. 2 a plan of the same with the dial removed: Fig. 3 a vertical longitudinal section on line $a$ of Figs. 1 and 2: Fig. 4 a vertical section on lines $b$ and $c$ of Figs. 1 and 2: and Fig. 5 a vertical transverse section on line $d$ of Figs. 1 and 2.

In the drawings:—1, indicates a gear adapted to be held in fixed position on or relative to the surface on which lines are to be laid off by means of the instrument: 2, holes through this gear to permit of the insertion of fastening devices, such as thumb-tacks, for instance, to serve in securing the gear fixedly to a drawing-board over the paper on which the protractor-work is to be done: 3, a pivot at the center of the gear: 4, a protractor arm mounted for angular motion on the pivot 3 and, preferably, having one of its edges radial to that pivot: 5, the heel of the arm, this heel being preferably formed as a separable piece firmly secured to the arm: 5ª, a pivot carried by the arm-heel at some distance from the pivot 3: 6, a pinion mounted for rotation on this pivot and gearing into the gear 1: 7, a gear fast with pinion 6: 8, a spindle mounted for rotation in the arm-heel: 9, a pinion fast on this spindle and engaging the gear 7: 10, a graduated dial fixedly secured to the arm-heel concentric with spindle 8: 11, an index hand carried by the spindle 8 and coöperating with the graduations of the dial, this hand being angularly adjustable upon its spindle and being, if desired, provided with a vernier where it coöperates with the graduations on the dial: 12, a locking clamp coöperating with the arm and with one of the gears and serving, when desired, to prevent the angular movement of the arm upon its pivot: 13, a scriber-block mounted for radial adjustment on the protractor arm and adapted to be clamped thereon in adjusted position: 14, a scriber mounted in the scriber-block and adapted to present its point to the paper or other surface on which the work is to be done: 15, a tee-head fixedly but separably secured below gear 1 when the instrument is to be used after the manner of a tee-square: 16, the screws by which the tee-head is secured to gear 1: and 17, a clamp-nut by means of which the index hand 11 is secured in selected angular position upon its spindle 8.

As seen in Figs. 2 and 4 the locking clamp 12 consists of a screw having a hook on its lower end to engage under gear 7, the nut of the screw coming on top of the gear and clamping it between the nut and hook and the body of the nut fitting a perforation in the heel 5 of the arm so that when the gear is clamped it cannot rotate relative to the arm and the entire system becomes rigid.

For the present ignore tee-head 15 and assume it to be absent. In such case gear 1 may be laid upon any flat surface on which protracting work is to be done, and the protractor arm may be swept angularly over that surface with the center of gear 1 as its axis of motion. Gear 1 is the fixed element of the system and is to be firmly secured in place upon the surface on which the work is to be done. The dial is fixed relative to the protractor arm. If, now, the arm be swung through a given angle it will carry pinion 6 a given angle around fixed gear 1, resulting in the rotation of the pinion and gear 7 through a very much greater angle than that swept through by the arm, the ratio of the angular movement of the arm to that of gear 7 being dependent on the ratio of gear 1 to pinion 6. The result of this turning of gear 7 is that pinion 9 and the index hand are turned through a greater angle than that moved through by gear 7, the index hand therefore traversing the dial through a greater number of degrees than that swept through by the protractor arm, and the general wearing may be so proportioned as to yield at the dial-reading a high multiplication of the angular movement of the protractor-arm. Comparatively coarse graduations on the dial may therefore serve in indexing minute angular departures of the protractor-arm.

In practice I have thus far employed proportions as follows: Fixed gear 1=144 teeth.

Pinions 6 and 9=18 teeth. Gear 7=135 teeth. Graduations on dial=360=degrees. The degrees of graduation on the dial to not represent degrees of movement for the protractor arm but merely degrees of the dial circle. When the protractor arm moves through one degree the index-hand moves through sixty degrees on the dial, and it follows that each degree on the dial represents a minute of movement by the protractor arm. By this means minutes of movement of the protractor arm can be read from comparatively coarse graduations on the dial and without the employment of any vernier. In practice I provide the index-hand with a vernier, of ordinary construction, permitting of reading to five seconds of movement of the protractor arm.

Taking the protractor arm in any given position, the nut 17 may be loosened and the loosened index hand may be swung upon its spindle and re-secured thereto, say at zero reading of the dial. The protractor arm may then be swung through desired angle or successive angles and lines marked from its edge.

While the instrument will be found of general utility in situations calling for accurate protractor work, it has been particularly designed with refernce to the laying out of angles on metal surfaces by tool makers, machinists, etc., and in such work it is often desirable to scribe circular arcs or complete circles before laying out the radial lines. For this purpose the scriber is provided, and in using it it is to be clamped in proper radial position upon the arm, after which the arm may be swung around and the point of the scriber describes the desired arc or circle.

Distinction should be drawn between the center of the dial and the center of the pivot on which the arm swings. These centers might coincide, but in the example they do not, and there is no necessary relation between them, it being only necessary that the arm should carry the center of the dial in such position that pinion 9 will properly engage gear 7. In other words, the center of the dial might be located at any point around gear 7 so long as it is at the proper radial distance from the center thereof.

Thus far it has been assumed that the instrument was being used with gear 1 secured in fixed position on the surface on which the protracting work is to be done, the pivot on which the protractor arm swings being thus a fixed one in the full sense of the term. But it is sometimes desirable to shift the center of the arm pivot in a right line and to move the protractor along the edge of a drawing-board or the like after the manner of a tee-square. In such case the tee-head 15 is to be secured to the gear 1, as by means of screws 16 and the instrument may then be used in the manner before described so far as the reading of angles is concerned, and it may be moved along the edge of a drawing-board or the like after the manner of a tee-square. The arm may be placed at right angles to the tee-head, or at any other desired angle thereto, and secured by means of the locking clamp 12, after which the instrument may be used not only as a tee-square but as a tee-square with protractor characteristics. If, when the instrument is thus being used as a tee-square it becomes desirable to fix it in some position along the edge of the drawing-board or the like, then thumb-tacks may be employed through the holes 2 in gear 1 in the same manner as if that gear were to be secured far within the margins of the drawing-board. Attention should be called to the fact that in the example the dial 10, while carried by the protractor arm in fixed relation to the arm, is separable from the arm and also adjustable angularly thereon. The arm-heel carries the boss forming a bearing for the spindle 8 and the dial fits snugly on this boss. The dial may be removed from the boss for convenience in getting at the parts below it, and it also may be angularly adjusted upon the boss for the purpose of bringing its zero of graduations at any desired point.

My invention is subject to quite a range of variations in specific construction and the particular form shown is to be viewed merely as an exemplification. I have simply set forth the principles of my invention and the best form in which I at present contemplate embodying that principle.

I claim:—

1. A protractor comprising, a first gear, means for securing that gear upon a surface and against rotation, a pivot supported at the center of that gear, a protractor arm mounted for angular motion on said pivot, a first pinion carried by the arm and engaging the first gear, a second gear fast with the first pinion, a second pinion carried by the arm and engaging the second gear, a graduated dial carried by the arm concentric with the axis of the second pinion, and an index hand carried by the second pinion and coöperating with the dial, combined substantially as set forth.

2. A protractor comprising, a first gear, means for securing that gear upon a surface and against rotation, a pivot supported at the center of that gear, a protractor arm mounted for angular motion on said pivot, a first pinion carried by the arm and engaging the first gear, a second gear fast with the first pinion, a second pinion carried by the arm and engaging the second gear, a graduated dial carried by the arm concentric with the axis of the second pinion, an index hand carried by the second pinion and coöperating with the dial, and means for locking the arms against rotation relative to said gears, combined substantially as set forth.

3. A protractor comprising, a first gear, means for securing that gear upon a surface and against rotation, a pivot supported at the center of that gear, a protractor arm mounted for angular motion on said pivot, a first pinion carried by the arm and engaging the first gear, a second gear fast with the first pinion, a second pinion carried by the arm and engaging the second gear, a graduated dial carried by the arm concentric with the axis of the second pinion, an index hand carried by the second pinion and coöperating with the dial, and means permitting the angular adjustment of the index hand relative to the second pinion, combined substantially as set forth.

4. A protractor comprising, a first gear, means for securing that gear upon a surface and against rotation, a pivot supported at the center of that gear, a protractor arm mounted for angular motion on said pivot, a first pinion carried by the arm and engaging the first gear, a second gear fast with the first pinion, a second pinion carried by the arm and engaging the second gear, a graduated dial carried by the arm concentric with the axis of the second pinion, means permitting the dial to be adjusted angularly with reference to the protractor arm, and an index hand carried by the second pinion and coöperating with the dial, combined substantially as set forth.

5. A protractor comprising, a first gear, means for securing that gear upon a surface and against rotation, a pivot supported at the center of that gear, a protractor arm mounted for angular motion on said pivot, a first pinion carried by the arm and engaging the first gear, a second gear fast with the first pinion, a second pinion carried by the arm and engaging the second gear, a graduated dial carried by the arm concentric with the axis of the second pinion, an index hand carried by the second pinion and coöperating with the dial, a scriber-block adapted to be secured at selected points along the length of the protractor arm, and a scriber carried by the scriber-block, combined substantially as set forth.

6. A protractor comprising, a first gear, means for securing that gear upon a surface and against rotation, a pivot supported at the center of that gear, a protractor arm mounted for angular motion on said pivot, a first pinion carried by the arm and engaging the first gear, a second gear fast with the first pinion, a second pinion carried by the arm and engaging the second gear, a graduated dial carried by the arm concentric with the axis of the second pinion, an index hand carried by the second pinion and coöperating with the dial, and a tee-head separably secured to the first gear, combined substantially as set forth.

7. A protractor comprising, a first gear, means for securing that gear against rotation, a pivot supported at the center of that gear, a protractor arm mounted for angular motion on said pivot, a graduated dial carried by the protractor arm, a spindle at the center of the dial, an index hand mounted on the spindle and coöperating with the dial and gearing connecting said spindle and first gear in such manner that as the protractor arm moves angularly the index hand and dial will partake of angular movement relative to each other, combined substantially as set forth.

CHARLES O. SCHELLENBACH.

Witnesses:
W. P. HUNT,
ALFRED BETTMAN.